(12) United States Patent
Maier

(10) Patent No.: US 9,157,813 B2
(45) Date of Patent: Oct. 13, 2015

(54) DEVICE FOR OUTPUTTING TEMPERATURE INFORMATION

(75) Inventor: Simon Maier, Feldkirch (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 273 days.

(21) Appl. No.: 13/878,631

(22) PCT Filed: Oct. 12, 2011

(86) PCT No.: PCT/EP2011/067771
§ 371 (c)(1),
(2), (4) Date: Apr. 10, 2013

(87) PCT Pub. No.: WO2012/049196
PCT Pub. Date: Apr. 19, 2012

(65) Prior Publication Data
US 2013/0207549 A1 Aug. 15, 2013

(30) Foreign Application Priority Data
Oct. 12, 2010 (DE) .......... 10 2010 042 310

(51) Int. Cl.
*G01K 13/00* (2006.01)
*H05B 37/03* (2006.01)
*H05B 41/285* (2006.01)

(52) U.S. Cl.
CPC ............ *G01K 13/00* (2013.01); *H05B 37/03* (2013.01); *H05B 41/2856* (2013.01)

(58) Field of Classification Search
USPC .............. 315/129, 134, 151, 158, 307–309
See application file for complete search history.

(56) References Cited

U.S. PATENT DOCUMENTS

| 5,803,018 | A | 9/1998 | Liou | |
| 5,811,942 | A * | 9/1998 | Pedretti | 315/312 |
| 6,578,979 | B2 | 6/2003 | Truttmann-Baettig | |
| 6,601,984 | B2 | 8/2003 | Yamamoto et al. | |
| 6,726,341 | B2 | 4/2004 | Pashley et al. | |
| 7,067,994 | B2 | 6/2006 | Soehnel | |
| 7,121,675 | B2 | 10/2006 | Ter-Hovhannisian | |
| 8,299,716 | B2 * | 10/2012 | Melzner et al. | 315/113 |
| 8,442,691 | B2 * | 5/2013 | Van Der Veen et al. | 700/275 |
| 2005/0047132 | A1 | 3/2005 | Dowling et al. | |
| 2008/0037239 | A1 | 2/2008 | Thomas et al. | |

FOREIGN PATENT DOCUMENTS

| DE | 29717144 U1 | 11/1997 |
| DE | 29814243 U1 | 11/1998 |
| DE | 10236212 A1 | 2/2004 |
| DE | 202007013346 U1 | 11/2007 |
| EP | 1191277 A2 | 3/2002 |
| EP | 1803377 A1 | 7/2007 |
| EP | 1857757 A2 | 11/2007 |
| EP | 1937037 A2 | 6/2008 |
| WO | 03055281 A1 | 7/2003 |
| WO | 2006126114 A1 | 11/2006 |
| WO | 2008061562 A1 | 5/2008 |

* cited by examiner

Primary Examiner — An Luu
(74) Attorney, Agent, or Firm — Volpe and Koenig, P.C.

(57) ABSTRACT

An operating device (1) is provided for at least one luminous element (2), including a measuring device configured to measure a temperature (T) present in the operating device (1) or in the surroundings of the operating device, and at least one interface connected to the measuring means and configured to output a piece of information regarding the measured temperature (T).

14 Claims, 1 Drawing Sheet

DEVICE FOR OUTPUTTING TEMPERATURE INFORMATION

FIELD OF THE INVENTION

The invention relates to a device for operating lighting means, such as for example a fluorescent lamps, gas discharge lamps, light emitting diodes (LEDs), organic light-emitting diodes (OLEDs), halogen lamps, etc. In particular, the present invention relates to an operating device which is suitable for having its inner temperature (i.e. in the housing) or temperature in its immediate vicinity measured and output directly or indirectly.

BACKGROUND

Operating devices, for example electronic ballasts, can be usually operated up to a maximum allowable temperature limit. When the operating device is used in a lamp, this temperature limit should not be exceeded. According to prior art, this serves to ensure that the temperature of an operating device in a lamp will not exceeded the permissible range. When this control then indicates that the temperature in the operating unit is too high, a conclusion can be made that there is an incompatibility between the device and the lamp and that the operating device should be changed. Alternatively, the present application or environment conditions may not be permissible, which is the case for example if the ambient temperature of the lamp is too high.

In this context, a measuring point is usually specified on the housing of the operating device in which a critical temperature is specified by the manufacturer of the operating device that may not be exceeded.

According to the prior art, a temperature sensor must be attached at the measuring point so that the user, for example a lamp manufacturer, can determine whether the installation of the operating device in its lamp is permissible. This is used in particular to guarantee aspects relating to safety, which are predetermined by required standards, as well as future warranty requirements. Normally, the lamp manufacturer must attach a measuring sensor to the housing since the operating device may not be opened. However, it is relatively expensive when a measuring sensor must be attached to each operating device to be measured. It would be therefore desirable if a simple alternative were provided.

If the critical temperature is exceeded, the lighting housing must be modified in such a way so that it would match the operating device being replaced and/or the application or environmental circumstances. It is known that excessively high temperatures of the operating device result in a reduced lifetime of the operating device.

It is also known from the prior art that temperature information relating to a lamp measured at the housing of a lighting means can be output. However, the lighting means and the operating device are often arranged separately in the housing of a lamp. Therefore, a measurement of the temperature of the lighting means cannot be applied to the determination of the temperature of the operating device.

The object of the invention is thus to provide an alternative for the user (for example the lamp manufacturer) to examine in a simple manner the compatibility between an operating device for a lighting means and the lamp in which it is installed. The goal is in particular to provide an operating device which enables easy verification of the permissibility of the installation of the operating device in a lamp.

This objective is achieved with the characteristics described in the independent claims. The dependent claims present the central idea of the invention in a particularly advantageous manner.

SUMMARY

According to a first aspect, the invention is provided with an operating device for at least one lighting means, comprising:

means for measuring the temperature present in the operating device or in its vicinity, at least one interface connected with the means for measuring, which is designed to output information relating to the measured temperature.

The temperature is measured in or directly on the operating device and forwarded outside via the interface. The temperature can thus be determined easily and quickly, for example in a testing facility in a laboratory of the lighting means manufacturer. The internally detected temperature information about the operating device, not about the lighting means, is thus transmitted outside via the interface. However, the temperature of the lighting means can also be measured and transmitted additionally. This may for example render unnecessary the extensive testing by means of a temperature detector attached to the housing of the operating device.

The admissibility of the integration in a lamp can thus be simplified to such an extent that the operating device then outputs the prevailing internal temperature as information relating to measured temperature. It is also advantageous that a signal relating to the measured temperature is already made available at an interface. With the corresponding evaluation, verification can be obtained as to whether the installation is allowed. The expense related to measurement is thus reduced for the user or for the lamp manufacturer.

The interface of the operating device can be designed so as to output the value of the present temperature. Since the information concerning the measured temperature represents the actual value of this temperature, a user can advantageously compare this output temperature with a threshold value or with a critical value which may not be exceeded during operation. Such a comparison can be also performed by a control unit, so that the determination of the admissibility of the installation in the lamp can then be carried out automatically.

The interface of the operating device can be designed to report when a threshold value is reached or exceeded, or when an impermissible temperature range has been reached. It is advantageous in this embodiment that the information or signal relating to the measured temperature in this case indicates that a temperature threshold was reached or exceeded. In other words, the comparison of the measured value to the threshold value or to an impermissible temperature range has been already made in the internal operating device unit, for example by a control circuit.

A user can in this case obtain the information directly or indirectly, namely whether the installation in a certain type of lamp is allowable or not, based on the utilized application or environmental conditions (for example the voltage level or ambient temperature). This can be performed in addition to or alternatively of the output of the actual value of the measured temperature.

The operating device can be also provided with an interface for the visual or acoustic output of the information relating to the present temperature. The interface can then be in particular configured in the form of an indicator, a display or a speaker. An advantage of this embodiment is that the user can for example read the directly measured temperature from a visual indicator. If the threshold value or an impermissible temperature range is reported, the interface can advantageously output an optical or audible warning signal. The warning signal can be perceived by the user for example as a specific beep sound or as an optical signal.

The optical signal may be provided with a memory connected to the interface for storage of the output temperature information. The operating device can be provided with a memory which is connected to the interface and used to store the output information relating to temperature. In this case it is advantageous when the temperature information is recorded so that it can be for example later processed and analyzed.

The operating device can be equipped with a data interface for output of information relating to the actual temperature.

An advantage of this configuration is that the information can be output as a data file and that the processing and analysis of the information can be provided automatically by machine.

To the data interface can be connected a communication line of the type wherein the information relating to the present temperature can be transmitted via the communication line. Preferably, the data file can then be transmitted through the communication line so that the processing or evaluation of this information does not necessarily need to be carried out directly at the operating device, as it can also be done remotely in a control unit connected with the communication line.

A temperature reading device can be also connected to the data interface in such a way that the device reading out the temperature indicates to the user the information relating to the measured temperature and/or processes the information internally. The readout device can advantageously indicate for example the value of the temperature, even when the operating device is not equipped with a suitable display or visual interface.

When it is detected that a temperature readout device is connected at the data interface, the operating device can automatically switch to temperature measuring and output operations. An advantage of this embodiment is that the testing of the permissibility of the installation of the operating device in a lamp can be started automatically, so that the user does not need to initiate this process separately.

These temperature measuring and output operations can also be triggered by an external control unit through the data interface, or by a technical fault incident during the operation of the operating device. It is advantageous in this case that the temperature measuring and output providing operations can be triggered with a connected data interface. Alternatively, the device can switch automatically to the temperature measuring and output providing operation when an improper operating state occurs.

The operating device can also be designed to switch to a recording mode when it receives a corresponding control command from the external control unit. In the recording mode, the temperature can be measured and recorded for example at regular intervals. The recorded data are then read out at the completion of the measurement. This can be used for example to perform a product release measurement in a laboratory or with a testing configuration.

The measurement of temperature and output of temperature information can take place continuously or in discrete time segments. This has the advantage that the permissibility of the installation of the operating device in a lamp can be tested over a longer period of time. Moreover, the temperature of the environment, in particular how quickly the temperature is increased, for example, can be traced and reconstructed.

The operating device may be provided with a temperature sensor for measurement of the present temperature. In this manner, a direct measurement is enabled within the operating device.

The operating device can alternatively or additionally include at least one measuring point, in which at least one such point can be used to measure electrical parameters having an influence on the actual temperature. Measurements of at least one electrical parameter can then be used to determine the temperature. It is advantageous in this case that no separate temperature sensor is required. The existing circuits or measurement points of the operating device can be used for this purpose.

In particular, the operating device can be provided with a control circuit which determines the present temperature based on the measured electrical parameters. The characteristic curves of the connected lamp can be used for the determination of the present temperature.

According to another aspect, the invention provides an operating device for at least one lighting means, comprising:
means for measuring the temperature present in the operating device or ambient temperature in the vicinity thereof,
means for determining the expected lifetime of the operating device based on the measured temperature and a lifetime table, and
at least one interface, which is designed to output information relating to the expected lifetime of the operating device. A user can thus determine in a simple manner the estimated lifetime of the device.

The various embodiments described above according to the first aspect of the invention apply here accordingly.

According to another aspect of the invention, a lighting system is provided, comprising
at least one operating device according to one of the preceding claims, provided with a data interface for output of temperature information,
a communication line connected with the operating device, and
a control device connected with the communication line, which is in particular designed to receive temperature information from the operating device and/or to trigger temperature operations and perform output operations when the device is operating.

According to another aspect of the device, a method for testing the permissibility of installing an operating device for a lighting means in a lamp is provided which comprises the following steps:
determining, by the operating device, the temperature in the operating device or the ambient temperature in its vicinity,
indicating or reporting, via an interface of the operating device, that the determined temperature or the fact that a temperature limit was reached. It is advantageous in this case when the determined temperature is output or displayed by an operating device, so that the known type of testing by means of a temperature detector which is connected to a measurement point of the housing of the operating device is rendered unnecessary.

BRIEF DESCRIPTION OF THE DRAWINGS

Other advantages, features and characteristics of the present invention will now be explained in more detail with reference to the drawings shown in accompanying figures, which show the following.

DETAILED DESCRIPTION OF THE PREFERRED EMBODIMENTS

Figure 1:
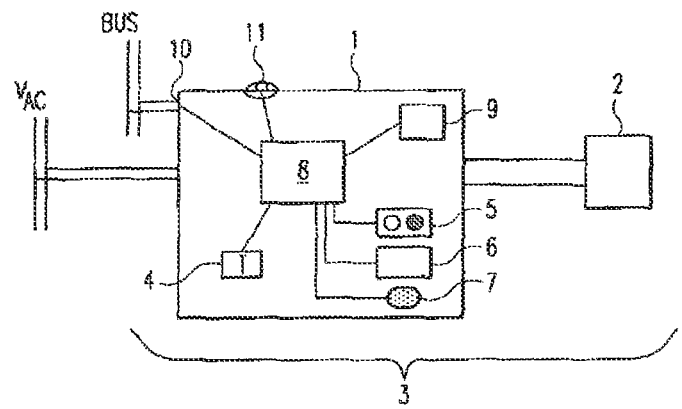
FIG. 1 shows a schematic view of an operating device according to the present invention.

FIG. 1 shows a schematic view of an embodiment, according to the invention, of an operating device 1 for a lighting means 2, which can be for example one or a plurality of fluorescent lamps, gas discharge lamps, light emitting diodes (LEDs), organic light-emitting diodes (OLEDs), or halogen lamps. Other lighting means can be also employed. When several lighting means are provided, they can be connected in series and/or with a parallel arrangement.

The operating device 1 used in a lamp 3, which is preferably an electronic ballast, is connected to a supply voltage, preferably to conventional supplied system voltage VAC. The operating device 1 supplies electrical energy to the lighting means 2. This electrical energy is preferably controlled or regulated in a known manner by a control switch 8 in such a way that the lighting means produces a desired brightness. The control circuit 1 can be configured as a microcontroller.

In accordance with the invention, reference will now be made to an operating device 1 which is able to determine with direct temperature measurement or with internal measurements of electrical parameters a temperature present in the operating device 1. According to the invention, the temperature information is then output via an interface as a data file, visually and/or audibly.

The operating device 1 is according to the embodiment shown in FIG. 1 provided with a temperature sensor 4. This sensor can measure temperature T in the operating device 1. Alternatively, the temperature sensor 4 can measure the ambient temperature of the operating device 1. Alternatively or additionally, a component part can be provided in the operating device 1 whose temperature-dependent characteristic curve can be used to determine the temperature of the operating device 1. This is described in more detail below. The measurement data of the temperature sensor 4 and/or of the component part 1 is preferably transmitted to a control circuit 8. Temperature sensors 8 are for example often provided with operating units 1 for LED applications so that direct measurement with the sensor 8 is advantageous in such a case.

In accordance with the invention, the actual temperature can be output or displayed, or it can be output or displayed only when the actual temperature is below or above a critical temperature.

The data, which is output according to the invention by the operating device 1, is therefore information relating to this measured temperature T. First, the value of the measured temperature can be output directly, for example via an indicator or a display 6. The value is displayed for example in degrees Celsius or in any other unit of measurement. Moreover, the control circuit 8 can compare the measured value with a threshold value Tc, so that the result of this comparison can be reproduced visually or audibly.

FIG. 1 shows in this context an indicator which has two different LEDs 5, where, for example, a red LED is lit up when the measured temperature T is above the threshold value Tc, in an impermissible range. If the temperature of the operating device remains below this threshold, for example a green LED can be lit up.

As an example of audible representation of the information relating to the measured temperature T, the operating device shown in FIG. 1 is provided with a speaker 7. Depending on whether the temperature T is in an impermissible region or not, the control circuit 8 will or will not cause the output of an audible warning signal. It is also possible to use a design wherein two different audible signals are output via the speaker 7 for the acceptable and impermissible region. Alternatively, only one audible signal is generated if the measured temperature T is in or out of the acceptable range.

The LEDs 5 and the speaker 7 are examples of visual and audible signaling at high temperatures.

The operating device 1 further includes a memory 9 connected with the control circuit. The threshold value Tc is stored in this memory 9. It is also possible to store different threshold values so that instead of only one threshold value TC, a range of impermissible temperature values can be defined.

Another aspect of the invention is that the output of the temperature information can also be performed over the operating time period of the operating device, and then for example read out again continuously or at predetermined time intervals. The memory 9, which can be arranged outside of the operating device 1, can then be used for example to store the information relating to the measured temperature. However, the memory can also be a part of the operating unit and it can be thus used to store the measured temperature, which makes it possible to create a record of the temperature information.

The temperature information can be stored in the operating device also continuously over a long period of time, or at discrete time segments, or it can also be triggered by events. The event can be for example an impermissible operating state of the operating device or of the lamp. For example, the operating device can determine and store the temperature just before one part of the operating device or the entire operating device is turned off due to a failure, for example with a defective lighting means.

When the operating device is designed to output the temperature that is in fact present, the user can determine, for example based on a lifetime table provided by the manufacturer of the operating device, what is the expected average lifetime in the case of the present application. Such a lifetime table can be also stored in the memory 9. A similar lifetime table defines for example for different maximum temperatures T of the operating device 1 the lifetime of the operating device 1 that can be expected in each case.

It is preferred when the estimated lifetime of the operating device 1 is determined by the control circuit 8 based on this lifetime table and based on the measured temperature information, so that it is also output in addition to the temperature information. Alternatively, this lifetime information can be output independently of the temperature information, preferably by itself. The estimated lifetime can be displayed on the display 6. Alternatively, for example the green LED 5 can be also lit up when the estimated lifetime is within a predetermined acceptable range. The red LED 5 would then be lit up when the estimated lifetime is below a threshold value.

According to the invention, one type of output of the temperature information can be provided as a data file through a data interface. FIG. 1 shows an embodiment in the form of a digital interface 10 with a connection to a bus line BUS. The digital interface can in particular correspond to the DALI (Digital Addressable Lighting Interface) standard. The operating device 1 can be preferably also controlled through this interface 10, for example from a central control (not shown).

This central control unit or another control units connected to the bus can specifically request the temperature information through this interface (for example DALI).

It may be also possible to transmit control commands through the DALI interface to the central control unit 1. The central control units transmits input commands, for example from a user, for instance via an input interface. For example, a command can be transmitted to the operating device 1 which then switches the device to the recording mode. The operating device is thus designed to switch to the recording mode when such a control command is received. In the recording mode, the operating device 1 performs recording of the temperature in the manner of a data logger. The operating device is thus measuring the temperature by means of a temperature sensor 4 and stores the measured values in the memory 9. After the completion of the measurement, or when a corresponding control command is received, the operating device 1 is again switched to the normal operating mode, and the recorded temperature can be output or read out. Release measurement is thus enabled, which can be performed for example in a laboratory of the manufacturer of the lamp in a testing facility.

In addition to the option to output the present temperature as a data file, for example via a connected bus line BUS, the invention also makes it possible to connect, at an interface of the operating device 1, a readout device (not shown), on which for example the currently present temperature T is indicated to the user.

A similar interface can be for instance a sensor interface 11 of the operating device 1, which is a known interface to which can be connected a daylight sensor. When instead of a daylight sensor the operating device 1 detects that a temperature readout device is connected, the operating device 1 can use this sensor interface 11 for output of temperature information. The operating device 1 can then automatically switch to the temperature registering mode so that the temperature is determined over a predetermined period of time and then transmitted via this interface 11 to the temperature readout device connected thereto.

As an alternative to the scenario described above, wherein a central control unit initiates output of temperature information through the digital interface 10, the operating device can in this case automatically switch to the temperature measuring and output providing operations when it is detected that a temperature readout device is connected at the sensor interface 11.

The indicator having the LEDs 5, the display 6 and the speaker 7 can be also located outside of the operating device 1. In this case, these units are preferably controlled by the sensor interface 11.

According to another embodiment of the invention, the temperature is not measured in the operating device or in its vicinity directly by the temperature sensor 4, but through internal measurements of electrical parameters ascertained in a known manner. These electrical parameters can be for example voltages, currents, resistance, etc.

Figure 2:
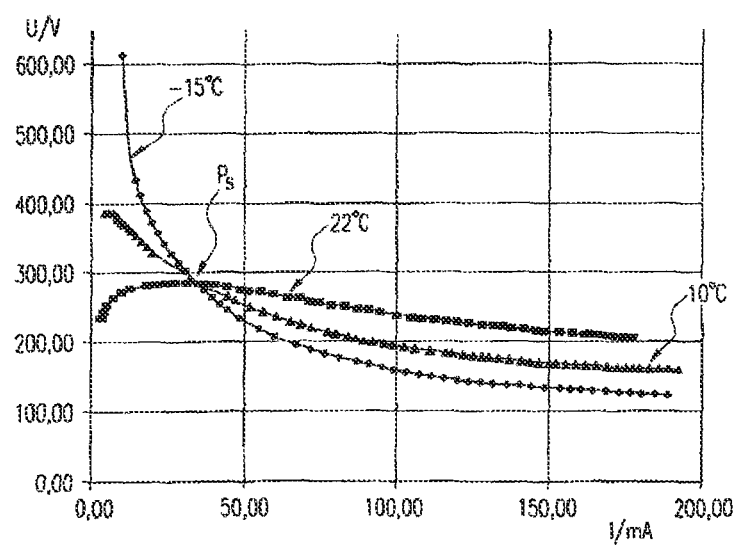
FIG. 2 shows a current-voltage diagram indicating the characteristic curves of a gas discharge lamp at different ambient temperatures.

Alternatively or additionally, the characteristic curves of the lighting means can be also used for temperature detection. FIG. 2 shows an example of a current-voltage diagram with the characteristic curves of a gas discharge lamp at different ambient temperatures. It is evident from the diagram that except at a specific operating point Ps, the ambient temperature of the gas discharge lamp is determined by the lamp voltage and the lamp current. The characteristic curves of the lighting means 2 can be thus stored in the memory 9 so that during measurement of electrical lamp parameters, such as for example the lamp current or the lamp voltage, the control circuit 8 can determine the ambient temperature of the lighting means and thus also the ambient temperature of the operating device. The temperature measurement can be performed for example during the introduction of the operating device with a microcontroller.

Alternatively or additionally, a direct determination of the temperature of the lighting means can be also performed. A second temperature sensor can be used in this case which measures the temperature directly in or on one or several lighting means and outputs it through this interface or through another interface. However, the temperature of the lighting means is used preferably as additional information, or in particular as additional information, especially for determining the ambient temperature of the operating device 1. Additionally or as an alternative to direct measurement of the temperature of the operating device 1, indirect measurement can be also carried out. For example the characteristic curve of a component part can be recorded for this purpose, wherein the component part is arranged or installed in the operating device 1. The additional temperature information obtained from the characteristic curve makes it possible to achieve a more accurate determination of the temperature of the operating device. The component can be for example a diode, a thermistor, a negative temperature coefficient thermistors or positive temperature coefficient thermistor or a similar suitable component part.

List of Reference Numerals
1 operating device
2 lighting means
3 lamp
4 temperature sensor
5 indicator with LEDs
6 display
7 speaker
8 control circuit
9 memory
10 digital interface
11 sensor interface

What is claimed is:

1. Operating device (1) for at least one lighting device (2), comprising
a measurement device configured to measure a temperature (T) present in the operating device (1) or in its vicinity,
at least one interface connected with the measurement device, which is configured to output information relating to the measured temperature (T); and
a data interface for output of information relating to the measured temperature (T), wherein when a temperature readout device is detected to be connected to the data interface, the operating device (1) automatically switches to temperature measuring and outputting operations.

2. The operating device (1) according to claim 1, wherein the at least one interface is configured to output a value of the present temperature (B).

3. The operating device (1) according to claim 1, wherein the interface is configured to provide a notice when a threshold value is reached or exceeded.

4. The operating device (1) according to claim 1, comprising an interface for visual or audible output of information relating to the measured temperature (T), in particular in the form of an indicator, a display, or a speaker.

5. The operating device (1) according to claim 1, comprising an external memory, or a memory integrated in the operating device which is connected with the at least one interface and provided for storage of temperature information output from the at least one interface.

6. The operating device (1) according to claim 1, wherein a communication line is connectable at the data interface such that the information relating to the present information can be transmitted through the communication line.

7. The operating device (1) according to claim 1, wherein a communication line is connectable to the data interface such that the information relating to the measured temperature (T) can be either displayed to a user or processed internally.

8. The operating device (1) according to claim 1, wherein the temperature measuring and outputting operations are triggered via a data interface, or by a technical fault event of the operating device (1).

9. The operating device (1) according to claim 8, wherein the operating device is configured to switch to recording mode when a corresponding control command is received from the external control unit.

10. The operating device (1) according to claim 1, wherein the temperature measurement and the output of temperature information takes place continuously or at discrete time intervals.

11. The operating device (1) according to claim 1, further comprising;
    a temperature sensor (4) for direct measurement of the present temperature (T), or
    at least one measurement point in which at least one electrical parameter influencing the actual measurable temperature, wherein measurements of at least one electrical parameter are used to determine the temperature.

12. The operating device (1) according to claim 10, comprising a control circuit (1) which detects based on measured electrical parameters the present temperature (T), wherein a characteristic curve (T) of the connecting lighting device is in particular used for determination of the present temperature (T).

13. Operating device (1) for at least one lighting device, comprising
    a measuring device configured to measure a temperature (T) in the operating device (1) or in its vicinity,
    a determining device (8) configured to determine an expected lifetime of the operating device (1) based on the measured temperature (T) and based on a lifetime table, and
    at least one interface, which is configured to output information relating to the expected lifetime of the operating device (1).

14. A lighting system, comprising
    at least one operating device comprising a measurement device configured to measure a temperature (T) present in the operating device (1) or in its vicinity, and at least one interface connected with the measurement device, which is configured to output information relating to the measured temperature (T) and a data interface for output of temperature information,
    a communication line connected with the operating device, and
    a control unit connected with the communication line, which is configured to receive temperature information from the operating device and/or to trigger temperature measuring and outputting operations wherein when a temperature readout device is detected to be connected to the data interface, the operating device (1) automatically switches to temperature measuring and outputting operations.

* * * * *